US012612194B2

(12) United States Patent  
Fujiwara

(10) Patent No.: US 12,612,194 B2  
(45) Date of Patent: Apr. 28, 2026

(54) AERIAL VEHICLE

(71) Applicant: Kubota Corporation, Osaka (JP)

(72) Inventor: Tetsuya Fujiwara, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 19/229,070

(22) Filed: Jun. 5, 2025

(65) Prior Publication Data

US 2025/0296711 A1 Sep. 25, 2025

Related U.S. Application Data

(63) Continuation of application No. PCT/JP2022/048352, filed on Dec. 27, 2022.

(51) Int. Cl.  
*B64U 20/70* (2023.01)  
*B64U 10/10* (2023.01)  
*B64U 101/60* (2023.01)

(52) U.S. Cl.  
CPC ............. *B64U 20/70* (2023.01); *B64U 10/10* (2023.01); *B64U 2101/60* (2023.01)

(58) Field of Classification Search  
CPC ..... B64U 20/70; B64U 10/10; B64U 2101/60  
See application file for complete search history.

(56) References Cited

U.S. PATENT DOCUMENTS 3,265,336 A * 8/1966 Peterson ................... B64C 1/22  
294/82.11  
3,598,440 A * 8/1971 Ramsden ................ B66C 1/101  
212/331

3,829,052 A * 8/1974 Flannelly ................ F16F 15/06  
84/DIG. 22  
3,833,189 A * 9/1974 Fowler .................... B64C 27/57  
244/177  
3,838,836 A * 10/1974 Asseo ....................... B64D 1/22  
244/137.4  
3,904,156 A * 9/1975 Smith ...................... B64D 1/22  
244/3  
3,934,847 A * 1/1976 Bentivegna .............. B64D 1/22  
441/83  
4,500,056 A * 2/1985 Della-Moretta ... B62D 53/0864  
244/137.4

(Continued)

FOREIGN PATENT DOCUMENTS

CN 107054653 A 8/2017  
JP 2010280251 A 12/2010  
JP 2021109467 A 8/2021

OTHER PUBLICATIONS

International Search Report in PCT/JP2022/048352, mailed Feb. 7, 2023, 2 pages.

*Primary Examiner* — Medhat Badawi  
(74) *Attorney, Agent, or Firm* — Keating & Bennett, LLP

(57) ABSTRACT

An aerial vehicle configured to fly with a load suspended therefrom includes a lift generator configured to generate lift for flight, a plurality of supports configured to support the load, an attachment to which the supports are attached, and a relay to relay and support the supports between the load and the attachment. One of the attachment and the relay is outward of, in an airframe of the aerial vehicle, an other one of the attachment and the relay in a plan view.

5 Claims, 3 Drawing Sheets

(56) References Cited

U.S. PATENT DOCUMENTS

| | | | |
|---|---|---|---|
| 5,465,925 A * | 11/1995 | Connolly | B64D 1/12 706/900 |
| 5,562,394 A * | 10/1996 | Brown, Jr. | B66C 1/66 414/626 |
| 5,593,113 A * | 1/1997 | Cox | B64D 1/22 294/82.26 |
| 5,826,825 A * | 10/1998 | Gabriel | B64D 1/22 244/137.4 |
| 5,871,249 A * | 2/1999 | Williams | G01C 21/18 74/5.34 |
| 7,954,766 B2 * | 6/2011 | Brainard | G01M 1/127 701/124 |
| 8,413,923 B2 * | 4/2013 | Brenner | G05D 1/0858 244/17.11 |
| 9,027,976 B1 * | 5/2015 | Tollenaere | B66C 1/127 294/75 |
| 9,079,662 B1 * | 7/2015 | Duffy | G05D 1/695 |
| 9,096,294 B1 * | 8/2015 | Dong | B63B 27/32 |
| 9,205,922 B1 * | 12/2015 | Bouwer | B64D 9/00 |
| 9,302,770 B2 * | 4/2016 | Burgess | B64D 1/12 |
| 9,422,139 B1 * | 8/2016 | Bialkowski | B66C 13/06 |
| 9,676,481 B1 * | 6/2017 | Buchmueller | G05D 1/0094 |
| 9,688,404 B1 * | 6/2017 | Buchmueller | G05D 1/00 |
| 9,718,547 B2 * | 8/2017 | Lesperance | G05D 1/102 |
| 9,845,154 B2 * | 12/2017 | Behrens | B64D 1/22 |
| 10,071,804 B1 * | 9/2018 | Buchmueller | B64U 50/19 |
| 10,479,503 B2 * | 11/2019 | Sikora | B64D 9/00 |
| 10,993,569 B2 * | 5/2021 | Gil | B65G 67/00 |
| 11,142,316 B2 * | 10/2021 | Sikora | B64D 9/00 |
| 11,209,836 B1 * | 12/2021 | Sikora | G05D 1/69 |
| 11,608,252 B1 * | 3/2023 | Schafer | B66D 3/18 |
| 11,649,049 B2 * | 5/2023 | Green | B64U 10/17 244/17.23 |
| 11,820,506 B2 * | 11/2023 | Suzuki | B64C 27/08 |
| 11,834,174 B2 * | 12/2023 | Sikora | B64D 9/00 |
| 11,834,181 B2 * | 12/2023 | Benner | B64U 80/25 |
| 11,840,333 B2 * | 12/2023 | Sweeny | B64D 1/10 |
| 11,858,637 B2 * | 1/2024 | Jarvis | B64D 1/12 |
| 12,037,117 B2 * | 7/2024 | Foggia | B64C 27/08 |
| 12,043,383 B2 * | 7/2024 | Campbell | B64C 27/08 |
| 12,054,252 B2 * | 8/2024 | Warner, IV | B64C 27/39 |
| 12,134,329 B2 * | 11/2024 | Todeschini | G05D 1/0202 |
| 12,208,897 B2 * | 1/2025 | Suzuki | B64U 40/20 |
| 12,258,145 B2 * | 3/2025 | Sikora | G05D 1/10 |
| 12,330,798 B2 * | 6/2025 | Suppes | B64U 20/70 |
| 12,404,053 B2 * | 9/2025 | Werner | B60L 53/36 |
| 2009/0146010 A1 * | 6/2009 | Cohen | B64D 1/22 701/3 |
| 2011/0192932 A1 * | 8/2011 | Brenner | B64D 1/22 244/17.13 |
| 2012/0145832 A1 * | 6/2012 | Schuster | B66D 3/18 244/137.4 |
| 2013/0056586 A1 * | 3/2013 | Occhiato | B64D 1/22 244/137.4 |
| 2016/0048131 A1 * | 2/2016 | Lesperance | G05D 1/102 701/8 |
| 2017/0129749 A1 * | 5/2017 | Rodríguez Mijangos | B66C 13/08 |
| 2017/0247109 A1 * | 8/2017 | Buchmueller | B64D 1/08 |
| 2018/0072404 A1 * | 3/2018 | Prager | B64D 1/22 |
| 2018/0099748 A1 * | 4/2018 | Lesperance | B64D 1/02 |
| 2018/0252616 A1 * | 9/2018 | Bryson | G07C 3/00 |
| 2019/0241267 A1 * | 8/2019 | Sikora | G05D 1/10 |
| 2020/0087121 A1 * | 3/2020 | Ohayon | B66C 13/06 |
| 2020/0094959 A1 * | 3/2020 | Suzuki | B64U 50/19 |
| 2021/0080979 A1 * | 3/2021 | Vander Lind | B64C 13/16 |
| 2023/0049474 A1 * | 2/2023 | Suzuki | B64D 1/22 |
| 2023/0257236 A1 * | 8/2023 | Schafer | B66C 13/06 212/273 |
| 2024/0087464 A1 * | 3/2024 | Dadkhah Tehrani | B64C 27/04 |
| 2024/0101287 A1 * | 3/2024 | Takahashi | B64U 80/86 |
| 2024/0101288 A1 * | 3/2024 | Takahashi | B64U 70/92 |
| 2024/0351684 A1 * | 10/2024 | Suzuki | B64C 17/02 |
| 2025/0108943 A1 * | 4/2025 | Sekiguchi | B64U 80/20 |

* cited by examiner

AERIAL VEHICLE

CROSS REFERENCE TO RELATED APPLICATIONS

This application is a Continuation Application of PCT Application No. PCT/JP2022/048352 filed on Dec. 27, 2022. The entire contents of this application are hereby incorporated herein by reference.

BACKGROUND OF THE INVENTION

1. Field of the Invention

The present invention relates to aerial vehicles each configured to fly with a load suspended therefrom.

2. Description of the Related Art

An aerial vehicle can fly while suspending and holding a load (article) such as a cargo. An aerial vehicle (unmanned aerial vehicle) disclosed in JP 2021-109467A suspends a load using a support (wire).

SUMMARY OF THE INVENTION

When an aerial vehicle flies with a load suspended therefrom, it may be difficult to control the aerial vehicle due to a combination of the influences of a configuration and position for suspending the load, the weight of a device for suspending the load, the operation of the device for suspending the load, and a disturbance such as wind.

Example embodiments of the present invention reduce the influences that interfere with accurate control of an aerial vehicle.

An aerial vehicle according to an example embodiment of the present invention is an aerial vehicle configured to fly with a load suspended therefrom, the aerial vehicle including a lift generator configured to generate lift for flight, a plurality of supports configured to support the load, an attachment to which the supports are attached, and a relay configured to relay and support the supports between the load and the attachment, one of the attachment and the relay being outward of, in an airframe of the aerial vehicle, an other one of the attachment and the relay in a plan view.

There are cases where a plurality of attachments and winders are provided in an outer region of the airframe to suspend a load from outside the airframe using a plurality of supports. In this case, the provision of the attachments and the winders increases the weight of the outer side of the airframe, making the airframe unstable. In addition, the weight of the load is received in the outer region of the airframe, which also makes the airframe unstable.

According to the above configuration, the lighter one of the attachment and the relay can be outward of, in the airframe, the heavier one. This reduces or prevents a weight increase in the outer region of the airframe, so that the weight balance of the airframe easily stabilizes the airframe. As a result, the stability of the airframe improves, and the aerial vehicle is able to be controlled accurately.

Further, the other one of the attachment and the relay may be located in a center region of the airframe in a plan view.

With this configuration, the heavier one of the attachment and the relay can be located in a center region of the airframe, e.g., at a position overlapping a center position/center of gravity position of the airframe in a plan view, and the lighter one can be located outward of the heavier one in the airframe (outer region). This allows the airframe to have a weight balance that stabilizes the airframe more easily, thus improving the stability of the airframe and allowing the aerial vehicle to be controlled accurately.

Further, the attachment may include a winder configured to feed or wind the supports to adjust lengths of the supports, and the relay may be outward of the winder.

This configuration allows the attachment to be outward of the winder, which is generally heavy. This reduces or prevents a weight increase in the outer region of the airframe, so that the weight balance of the airframe easily stabilizes the airframe. As a result, the stability of the airframe improves, and the aerial vehicle is able to be controlled accurately.

Further, the winder may include a plurality of motors each being configured to adjust a length of a corresponding one of the supports, the plurality of motors may be housed in a motor assembly, the motor assembly may include a waterproof section and a dustproof section, and the motor assembly may be in a center region of the airframe in a plan view.

With this configuration, the motors, which are generally heavy, are located in the center region of the airframe. This reduces or prevents a weight increase in the outer region of the airframe, so that the weight balance of the airframe easily stabilizes the airframe. Further, the plurality of motors are unitized, and this assembly includes the waterproof section and the dustproof section. This makes the total weight of the motors lighter than in a configuration in which the waterproof section and the dustproof section are provided on each of the motors to reduce the weight of the airframe. As a result, the stability of the airframe improves, and the aerial vehicle is easily controllable.

Further, the lift generator may include a main lift generator configured to generate the lift to propel the airframe, and a secondary lift generator configured to generate the lift to control an orientation of the airframe, and the relay may overlap the secondary lift generator in a plan view.

The main lift generator generates buoyancy and driving force for the airframe, while the secondary lift generator controls the orientation of the airframe. Providing the relay in a region immediately below the secondary lift generator allows the secondary lift generator to efficiently control the orientation of a portion where the relay is arranged. As a result, the stability of the airframe is improved, and the aerial vehicle is accurately controllable.

Further, the relay may include a pulley.

This configuration makes it possible to reduce friction generated on the wire.

Further, the lift generator may include a rotor.

This configuration makes it possible to easily generate lift to cause the aerial vehicle to fly.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
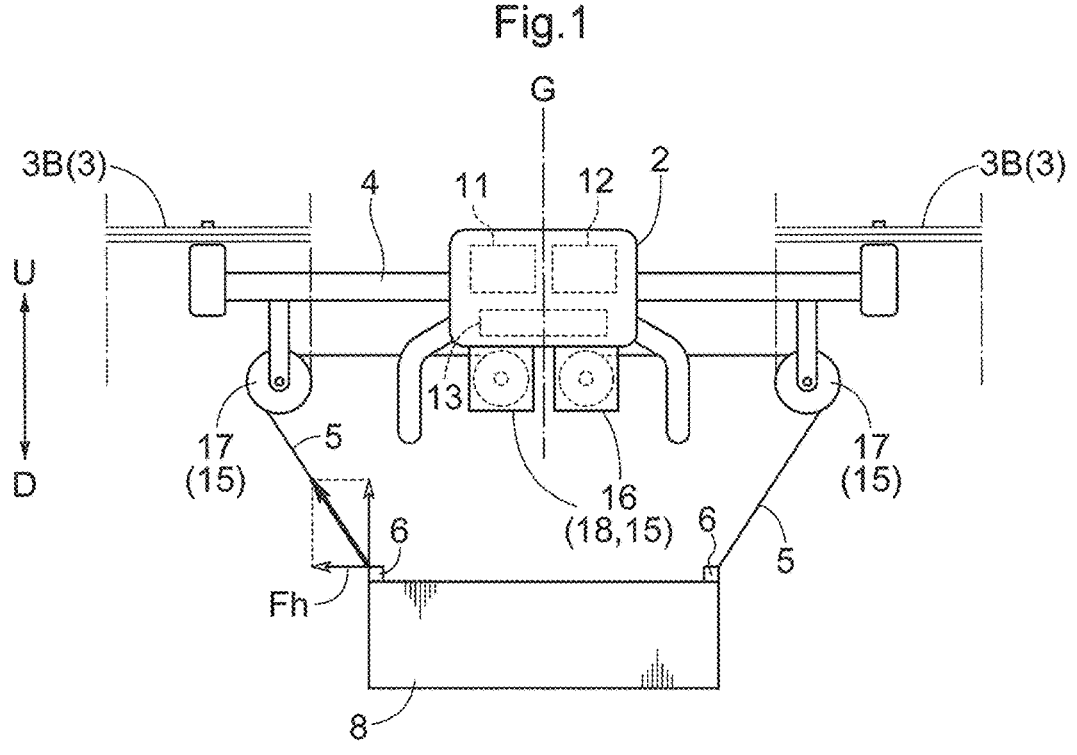
FIG. 1 is a side view of an example of a configuration of an aerial vehicle with a load suspended therefrom.
Figure 2:
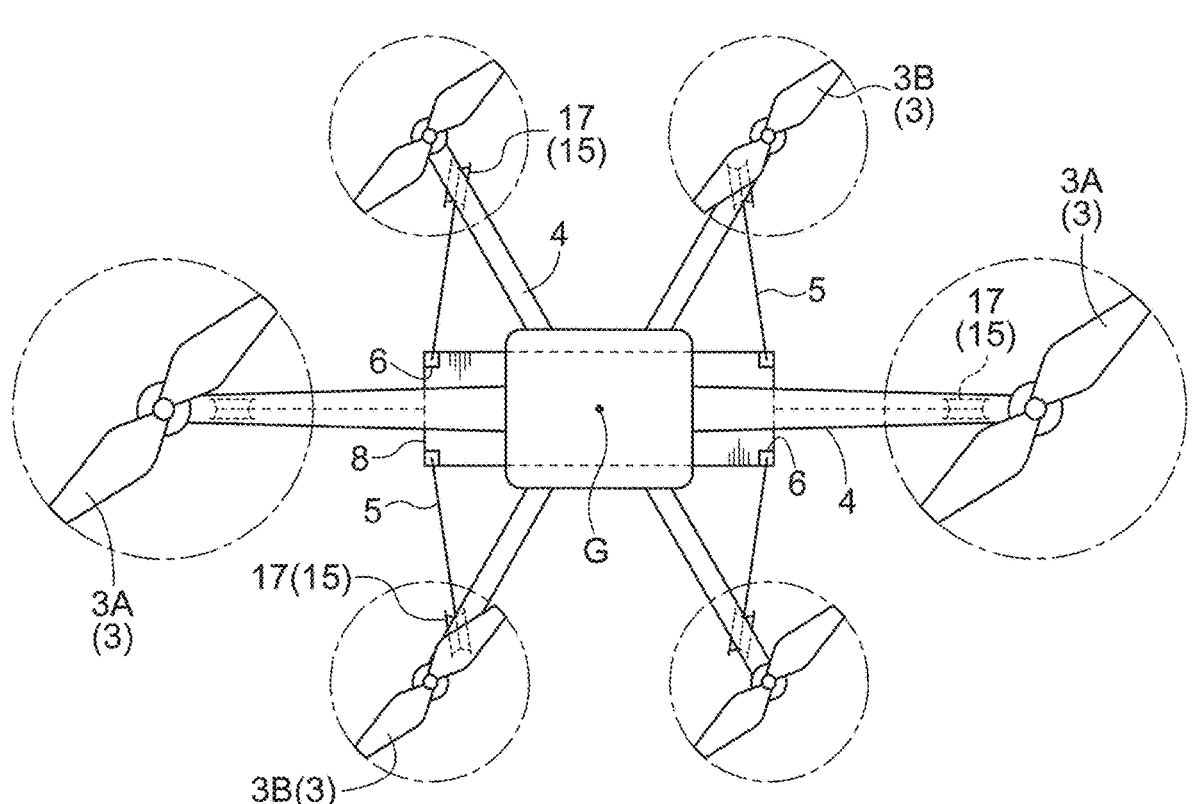
FIG. 2 is a plan view of the example of the configuration of the aerial vehicle with the load suspended therefrom.

First, an aerial vehicle that flies with a load 8 suspended therefrom is described using a drone with the load 8 suspended therefrom as an example, with reference to FIGS. 1 and 2. Note that the load 8 may be luggage (transported object) transported by the drone, a work machine suspended from the drone and moved by the drone to perform work, or the like, and may be anything that can be suspended from the drone and flown thereby.

The drone, which is an example of the aerial vehicle, includes a body 2. The drone includes a plurality of rotors 3, each of which is an example of a lift generator utilized for flight, a support, and an arm 4. The arm 4 protrudes from the body 2 to the outside of the airframe. The rotors 3 are supported by the arm 4. The drone includes main rotors 3A (main lift generator) and sub-rotors 3B (secondary lift generator) as the rotors 3. Each main rotor 3A generates lift to propel the airframe (to lift, rise, and descend) and fly, while each sub-rotor 3B is used to control the orientation of the drone. The support includes, for example, a plurality of wires 5, or may alternatively be a rod-shaped structure or the like that is stretchable and contractible and/or swingable about a rotation support point. In the following, a drone using the rotors 3 as the lift generator and the wires 5 as the support is described as an example.

Each wire 5 is supported by the drone via an attachment assembly 15. Each wire 5 includes a support 6 such as a hook at its end. The load 8 is suspended from the drone by being supported by the wires 5 with the supports 6. The drone can fly while carrying the load 8. Also, a configuration in which the load 8 is suspended is used, thus facilitating the attachment and detachment of the load 8.

The body 2 includes an engine 11, a generator 12, and a battery 13. The generator 12 generates electric power using motive power output from the engine 11, and the generated electric power is stored in the battery 13. The rotors 3 operate using the motive power output from the engine 11, the electric power generated by the generator 12, or the electric power stored in the battery 13. For example, the main rotors 3A may operate using the motive power output from the engine 11, and the sub-rotors 3B may operate using the electric power generated by the generator 12 or the electric power stored in the battery 13. Conversely, the main rotors 3A may operate using the electric power generated by the generator 12 or the electric power stored in the battery 13, and the sub-rotors 3B may operate using the motive power output from the engine 11.

As shown in FIG. 1, the attachment assemblies 15 are provided for the respective wires 5, and each attachment assembly 15 includes an attachment 16 to which the wire 5 is attached, and a relay 17 to support the wire 5. The wire 5 is attached to the airframe via the attachment 16 and supported by the airframe via the relay 17. While the load 8 is suspended, the wire 5 extends from the relay 17 toward the load 8. The attachment 16 in this example embodiment is a motor 18 that is a winder capable of feeding or winding the wire 5 to adjust the length of the wire 5 from the airframe to the load 8. That is, the attachment assemblies 15 preferably include the same number of motors 18 and relays 17 as the number of wires 5, for example. By adjusting the length of the wire 5 using the motor 18, the orientation of the load 8 can be stabilized to improve the stability of the airframe, and the aerial vehicle is able to be controlled accurately. For example, the relay 17 includes a pulley and supports the wire 5, whose length is changed, in a state in which friction is reduced. Each motor 18 operates using the electric power generated by the generator 12 or the electric power stored in the battery 13.

At least one of the motors 18 is provided in a center region of the airframe, and preferably all of the motors 18 are provided in the center region of the airframe on a lower surface of the body 2. The center region is a region that includes a center position or a center of gravity position G of the airframe in a plan view and near the center position or the center of gravity position G. For example, the plurality of motors 18 are arranged close to each other, and the motors 18 are arranged such that the center of gravity position in an aggregate of the plurality of motors 18 is at a position overlapping or near the center position or the center of gravity position G of the airframe in a plan view. Note that the center position is a position of a midpoint of the length of the drone in the width direction of the airframe, e.g., a position of a midpoint of the length of the body 2 in the width direction.

The relay 17 is provided in a region on the outer side (outer region) of the airframe. The outer region is a region outward of the center position or the center of gravity position G of the airframe or the body 2 in a plan view, and is a region outward of the center region. For example, the relay 17 is outward of the motor 18 in a plan view. Note that all of the relays 17 may be outward of all of the motors 18. However, if each relay 17 is outward the motor 18 supporting the same wire 5, the relay 17 need not necessarily be outward of the other motors 18.

Specifically, the motors 18 are provided in the center region of the body 2, and the relay 17 is provided on the arm 4. Further, the relay 17 is preferably provided in an end region of the arm 4 separated from the body 2.

As a result of providing the relay 17 in the outer region of the airframe, the load 8 can be suspended below the center region of the airframe by the wire 5 from the periphery (outer region) of the airframe without providing the motor 18 in the outer region of the airframe. By suspending the load 8 from the periphery of the airframe, a plurality of lateral outward forces Fh are applied to the load 8. Those forces Fh pull the load 8 toward the periphery and reduce or prevent the disorder and rotation of the orientation caused by disturbance or the like, thus allowing the load 8 to be suspended stably. As a result, the aerial vehicle is able to be controlled accurately.

Generally, the motor 18 is heavier than the relay 17. When the center of gravity of the airframe is near the center region of the airframe, the airframe is more stable and it is easier to control the orientation of the airframe than when the center of gravity of the airframe is in the outer region of the airframe. Therefore, by positioning the relay 17 outward of the motor 18, the outer region of the airframe is lighter than the center region of the airframe, thus stabilizing the airframe. As a result, the aerial vehicle is able to be controlled accurately.

It is preferable that the relay 17 is located at a position overlapping the rotor 3 in a plan view. Further, it is more preferable that the relay 17 is located at a position overlapping the sub-rotor 3B in a plan view as shown in FIGS. 1 and 2. For example, it is preferable that a center portion of the relay 17 and a center portion of the sub-rotor 3B overlap each other in a plan view. There are cases where the airframe is difficult to balance due to a stress (moment) generated in the relay 17 by supporting the wire 5 suspending the load 8, and the weight of the relay 17. Even in those cases, the sub-rotor 3B can efficiently exert lift on the relay 17, and easily stabilizes the airframe.

Also, a stress (moment) is generated by the motor 18 feeding or winding the wire 5. When the moment is generated in the outer region of the airframe, it is difficult to control the orientation of the airframe in conjunction with the influence of disturbance such as a turbulence of air flow. Since the motor 18 is in the center region of the airframe, the moment generated in the outer region of the airframe can be reduced or prevented. As a result, the stability of the airframe improves, and the aerial vehicle is able to be controlled accurately.

Figure 3:
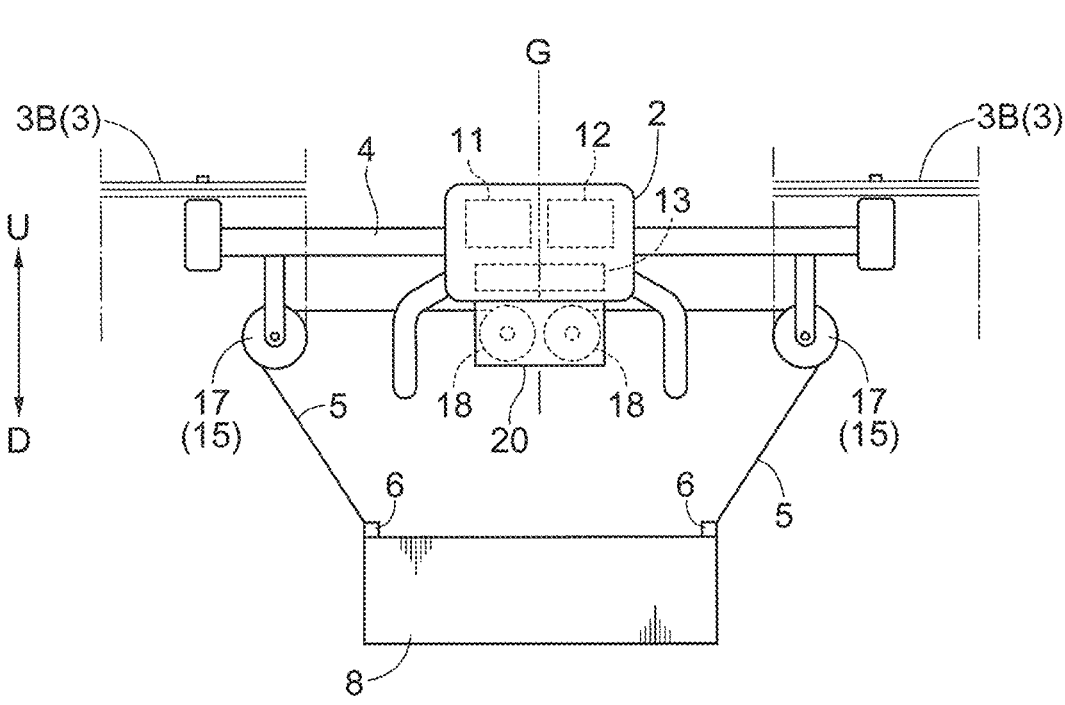
FIG. 3 is a diagram showing an example of a configuration of a motor assembly.

Furthermore, the drone preferably includes a motor assembly 20 as shown in FIG. 3. The motor assembly 20 includes a hollow body whose periphery is surrounded by walls, and the lower surface of the body 2 may be used as one of the surfaces of the motor assembly 20. The motor assembly 20 includes a waterproof section (not shown) in, for example, each of a hole through which the wire 5 extending from the motor 18 to the relay 17 passes, a region where a wall and the body 2 are in contact with each other, and a region where adjacent walls are in contact with each other. Also, the motor assembly 20 includes an outside air introduction port (not shown) to dissipate heat generated by the motor 18, and includes a dustproof section (not shown) at the outside air introduction port. This configuration prevents moisture, dust, and the like from entering the motor assembly 20 from the outside.

The motor assembly 20 houses at least two or more of the plurality of motors 18 therein. Preferably, the motor assembly 20 houses all of the motors 18 therein. Note that at least some of the motors 18 may be housed in one motor assembly 20, or the motors 18 may be housed in a plurality of motor assemblies 20 in a distributed manner. The motor assembly 20 is provided in the center region of the airframe in a plan view on the lower surface of the body 2. Preferably, the motor assembly 20 is positioned such that its center of gravity position is at or near the center position or the center of gravity position G of the airframe in a plan view. In a case where a plurality of motor assemblies 20 are provided, the motor assemblies 20 are positioned such that the center of gravity position of an aggregate of the motor assemblies 20 is at a position overlapping or near the center position or the center of gravity position G of the airframe in a plan view. This improves the stability of the airframe.

The motors 18 are electrical components, and preferably are protected from water and dust. Housing the motors 18 in the motor assembly 20 including the waterproof section and the dustproof section eliminates the need to provide the waterproof section and the dustproof section on each motor 18. Thus, the total weight of the motor assembly 20 and all of the motors 18 is less than the total weight of all of the motors 18 in the configuration in which each motor 18 is provided with the waterproof section and the dustproof section. As a result, the weight of the airframe is reduced, thus improving the stability of the airframe and extending the drone's range.

Figure 4:
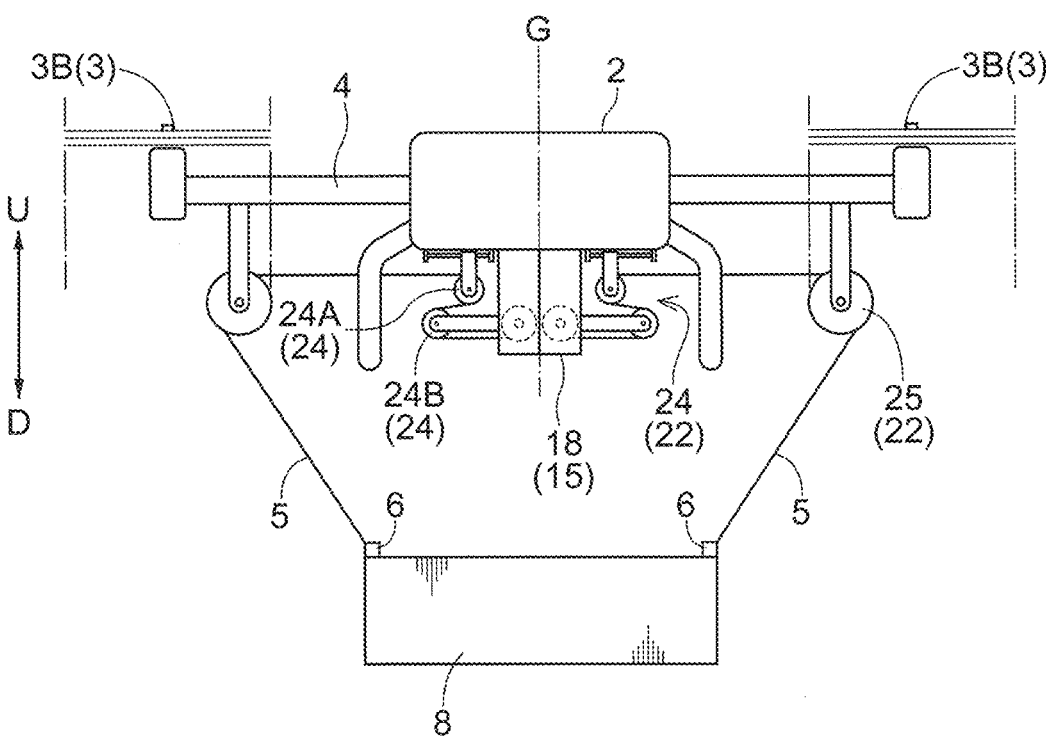
FIG. 4 is a diagram showing an example of a configuration of a relay assembly.

In the above example embodiments, the attachment assembly 15 may include a relay assembly 22 in place of the relay 17, as shown in FIG. 4. The relay assembly 22 includes a plurality of relays 17 that relay and support the wires 5 between the load 8 and the motors 18. The relay assembly 22 is preferably provided for each wire 5.

By providing the relay assembly 22, the arrangement of the motors 18, the positional relationship between the motors 18 and the relay assembly 22, and the configuration of the relay assembly 22 can be adjusted flexibly to improve the weight balance of the airframe. As a result, it is possible to stably suspend the load 8 and improve the stability of the airframe, thus allowing the aerial vehicle to be controlled accurately. Further, the position where the load 8 is suspended on the airframe can be freely set. For example, the load 8 can be suspended at a proper position using one wire 5. In a case where the load 8 is suspended by a plurality of wires 5, the wires 5 can be attached at proper positions to suspend the load 8 in a well-balanced manner. This can also improve the stability of the airframe and allows the aerial vehicle to be controlled accurately.

At least one of the relays 17 may be a pulley. Further, the pulley may include a fixed pulley and a movable pulley. Use of the pulley can reduce friction when supporting the wire 5.

For example, the relay assembly 22 includes a first relay 24 and a second relay 25. Each wire 5 is connected to the load 8 from the motor 18 via the first relay 24 and the second relay 25 in this order. One of the first relay 24 and the second relay 25 is in the center region of the airframe, and the other is in the outer region of the airframe.

The first relay 24 includes a combination of a movable pulley 24A and a fixed pulley 24B, and the second relay 25 is a fixed pulley. The fixed pulley 24B and the movable pulley 24A support the wire 5. The fixed pulley 24B is fixed to the airframe, e.g., to the body 2. The movable pulley 24A is supported by the airframe in a manner movable in response to the feeding or winding of the wire 5. For example, the movable pulley 24A can move along a rail provided on the body 2.

The provision of the first relay 24 that combines the fixed pulley 24B and the movable pulley 24A can reduce the force required for the motor 18 to wind the wire 5 (hoist the load 8) and reduce the size of the motor 18. As a result, the weight to be reduced by reducing the size of the motor 18 can be expected to be greater than the weight to be increased by providing the first relay 24, and the total weight of the airframe can be reduced. As a result, the range can be increased, and the aerial vehicle is able to be controlled accurately. In addition, reducing the total weight of the airframe can improve the payload of the aerial vehicle and support a heavier load 8.

It is preferable that the second relay 25 is outward of the first relay 24. That is, it is preferable that the first relay 24 is in the center region of the airframe, and the second relay 25 is in the outer region of the airframe. For example, the second relay 25 can be positioned to overlap the sub-rotor 3B in a plan view. Specifically, it is preferable that a center portion of the second relay 25 overlaps a center portion of the sub-rotor 3B in a plan view. It is also preferable that the motor 18 is inward of the second relay 25 (on the center position side or the center of gravity position G side of the airframe), preferably in the center region, and more preferably, inward of the first relay 24.

This makes it possible to improve or optimize the weight balance of the airframe and accurately control the aerial vehicle.

Note that the load 8 is not limited to being suspended by a plurality of wires 5, and may alternatively be suspended by one wire 5. In this case, it is preferable that the second relay 25 is provided in the center region of the airframe, and the load 8 is suspended below the center region of the airframe.

In this case as well, the provision of the first relay 24 can reduce the size of the motor 18 and the weight of the airframe.

In each of the above example embodiments, the relay 17 is not limited to being outward of the motor 18. Alternatively, the relay 17 may be in the center region, and the motor 18 may be outward of the relay 17. That is, one of the motor 18 (attachment 16) and the relay 17 is outward, in the airframe, of the other one in a plan view. For example, one of the motor 18 (attachment 16) and the relay 17 is in the center region, and the other is in the outer region.

As described above, if the motor 18 is heavier than the relay 17, the stability of the airframe is improved and the aerial vehicle is able to be accurately controlled by positioning the relay 17 outward of the motor 18. Conversely, if the relay 17 is heavier than the motor 18 (attachment 16), the motor 18 (attachment 16) may be outward of the relay 17. This can improve the stability of the airframe and allows the aerial vehicle to be controlled accurately. That is, the lighter one of the motor 18 (attachment 16) and the relay 17 may be outward of the heavier one in a plan view. This can make the outer region of the airframe lighter, which improves the stability of the airframe and allows the aerial vehicle to be controlled accurately.

Further, considering not only the weight of the motor 18 (attachment 16) and the weight of the relay 17, but also the moment applied to the motor 18 and the influence of disturbance and the like in addition to those weights in total, it is preferable to determine the disposition of the motor 18 (attachment 16) and the relay 17 such that the airframe is more stable.

In each of the above example embodiments, the attachment assembly 15 may alternatively be an attachment 16 that fixedly supports the wire 5, in place of the motor 18 that is the winder.

Figure 5:
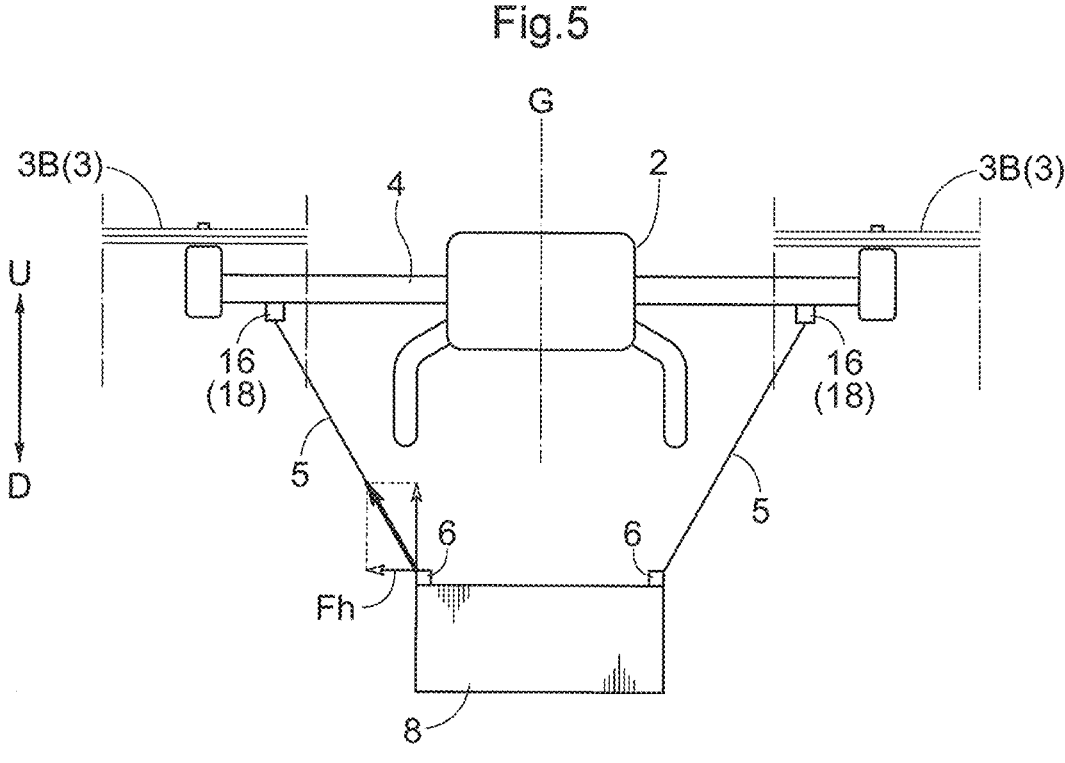
FIG. 5 is a side view of an example of a configuration of the aerial vehicle provided with attachments as an attachment assembly.

In each of the above example embodiments, the wire 5 is not limited to being supported by the drone via the attachment assembly 15, and may alternatively be directly supported by the drone with the attachment 16 instead of the motor 18 and the relay 17, as shown in FIG. 5. The attachment 16 is outward of the center position or the center of gravity position G of the body 2, i.e., at a position separated in an outward direction from the center position or the center of gravity position G of the body 2. In other words, the attachment 16 is in a region between the rotor 3 (sub-rotor 3B) and a midpoint of a line connecting the center position or the center of gravity position G of the body 2 and a center portion of the rotor 3 that is the axis thereof (axis of the sub-rotor 3B) in a plan view, that is, in a region outward of the midpoint. For example, the attachment 16 is provided on the arm 4, more preferably at an end region of the arm 4 separated from the body 2. Alternatively, the attachment 16 may be in a region of the body 2 outward of a midpoint between the center position or the center of gravity position G of the body 2 and an outer edge of the body 2 in a plan view. More preferably, the attachment 16 may be at or near an outer end of the body 2 that is a boundary with the arm 4.

This configuration allows the load 8 to be suspended below the center region of the airframe from the periphery (outer region) of the airframe by the wire 5. By suspending the load 8 from the periphery of the airframe, the load 8 can be pulled toward the periphery and stably suspended. As a result, the aerial vehicle is able to be controlled accurately.

The attachments 16 can be arranged in a distributed manner in the outer region of the airframe to make it easy to keep the proper weight balance of the airframe. Further, the suspension load of the load 8 is dispersed, making it easy to achieve an appropriate structure of the airframe for securing the strength necessary to hold the attachments 16 and the load 8. As a result, the airframe can be easily stabilized and reduced in weight, and the aerial vehicle is able to be controlled accurately.

Furthermore, the attachment 16 can be configured to simply fix and support the wire 5 to make it relatively easy to reduce the weight, and it is possible to reduce or prevent a weight increase in the outer region of the airframe. As a result, the stability of the airframe is improved, and the aerial vehicle is able to be controlled accurately.

Furthermore, it is preferable that the attachment 16 is arranged at a position overlapping the rotor 3, more preferably the sub-rotor 3B in a plan view. For example, it is preferable that a center portion of the attachment 16 overlaps a center portion of the sub-rotor 3B in a plan view. The rotor 3 generates lift, and particularly, the sub-rotor 3B generates lift to control the orientation of the airframe. By providing the attachment 16 at a position overlapping the sub-rotor 3B, the lift generated by the sub-rotor 3B can be adjusted in correspondence with the weight of the attachment 16, the moment generated in the attachment 16 by suspending the load 8, and the like. Thus, the stability of the airframe is easily improved.

In the above example embodiments, the attachment 16 may be a winder that adjusts the length of the wire 5, such as the motor 18. This configuration makes it possible to adjust the length of the wire 5 and easily stabilize the orientation of the load 8.

Figure 6:
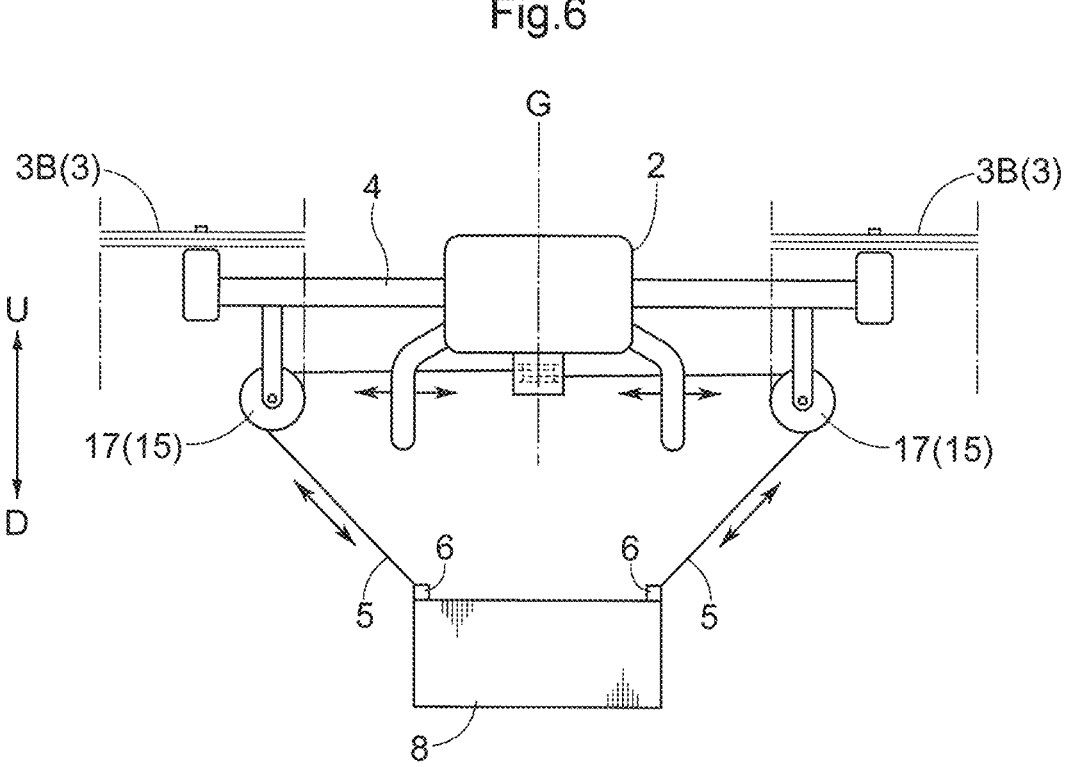
FIG. 6 is a side view of an example of a configuration of the aerial vehicle that suspends a load using a looped wire.

The configuration for suspending the load 8 from a plurality of points (multi-point suspension) is not limited to using a plurality of wires 5, and may be such that the load 8 is suspended from two points using one looped wire 5, as shown in FIG. 6.

A drone in this example embodiment includes a motor 18 provided in the center region of the airframe, and two relays 17 provided in the outer region of the airframe. For example, the motor 18 is at a position overlapping the center position or the center of gravity position G of the airframe in a plan view in a lower part of the body 2. The two relays 17 are arranged in respective end regions of the airframe, e.g., end regions of the arm 4, so as to face each other with the center position or the center of gravity position G of the airframe therebetween in a plan view.

The wire 5 includes supports 6 at both ends, and supports the load 8 from two points using the two supports 6. That is, the wire 5, including the load 8, defines a loop shape. The motor 18 and the two relays 17 support the wire 5. That is, the wire 5 is supported by the airframe at three positions, i.e., the motor 18 and the two relays 17. Since the relays 17 support the wire 5 in two outer regions facing each other, the load 8 is suspended from two points. Note that each relay 17 may be a pulley.

The motor 18 supports an intermediate portion of the wire 5, so that the wire 5 protrudes from two positions on the motor 18. The motor 18 can feed the wire 5 from one side to the other side. In the example of FIG. 6, the motor 18 can feed the wire 5 to the left or right. Since the wire 5 is supported by the two relays 17, the length of the wire 5 from one relay 17 to the load 8 becomes longer and the length of the wire 5 from the other relay 17 to the load 8 becomes shorter as a result of the motor 18 feeding the wire 5 to the left or right. This makes it possible to adjust the length of the wire 5 from the airframe to the load 8 so as to stabilize the orientation of the load 8.

Since one motor 18 feeds the wire 5 in either of two directions, only one motor 18 is needed for every two points at which the load 8 is supported. This makes it possible to reduce the number of motors 18 and the weight of the airframe. Further, since the number of motors 18 is reduced, the weight of a frame or the like supporting the motor 18 is reduced. The weight of the airframe is able to be reduced in this respect as well. As a result, the aerial vehicle is able to be controlled accurately. Also, it is possible to improve or optimize the weight balance of the airframe and accurately control the aerial vehicle by providing the motor 18 in the center region of the airframe.

Note that the drone is not limited to including one wire 5, one motor 18, and two relays 17, and may alternatively include a plurality of sets each including one wire 5, one motor 18, and two relays 17.

In each of the above example embodiments, the configuration may be used in which two main rotors 3A and four sub-rotors 3B are provided as shown in FIG. 2, for example. However, any number of main rotors 3A and sub-rotors 3B may be provided. Further, there is no limitation to the configuration in which the main rotor 3A propels the airframe and the sub-rotor 3B controls the orientation of the airframe, and the main rotor 3A and the sub-rotor 3B may each have any function. For example, the main rotor 3A may have a function of controlling the orientation in addition to propelling the airframe, while the sub-rotor 3B may have a function of assisting the thrust of the main rotor 3A.

Further, in each of the above example embodiments, an example has been illustrated in which any of the relay 17, the second relay 25, and the attachment 16 is positioned to overlap the sub-rotor 3B. Here, any of the relay 17, the second relay 25, and the attachment 16 may also be positioned to overlap the main rotor 3A. That is, any of the relay 17, the second relay 25, and the attachment 16 may be positioned to overlap either the main rotor 3A or the sub-rotor 3B, depending on the functions, arrangement, number, or the like of the main rotor 3A and sub-rotor 3B.

In each of the above example embodiments, the arm 4 may be omitted, and the rotor 3, the attachment 16, and the relay 17 may be supported by the body 2. In this case, it is preferable that at least either the attachment 16 or the relay 17 is outward of the center position or the center of gravity position G of the body 2. Further, the attachment 16 and the relay 17 may be supported by the rotor 3.

Example embodiments of the present invention can be applied to aerial vehicles capable of flying with any load suspended using a wire.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An aerial vehicle configured to fly with a load suspended from the aerial vehicle, the aerial vehicle comprising:
   a body;
   a plurality of arms protruding outside from the body;
   a plurality of lift generators provided for respective arms and configured to generate lift for flight;
   a plurality of supports configured to support the load;
   a plurality of attachments provided for the respective supports to which the respective supports are attached; and
   a plurality of relays configured to relay and support the respective supports between the load and the respective attachments; wherein
   the attachments are within the body in a plan view;
   each of the relays is in an end region of a corresponding one of the arms separated from the body;
   the lift generators include at least one main lift generator configured to generate the lift to propel an airframe of the aerial vehicle, and at least one secondary lift generator configured to generate the lift to control an orientation of the airframe; and
   a center portion of each of the relays overlaps a center portion of the corresponding secondary lift generator in a plan view.

2. The aerial vehicle according to claim 1, wherein each of the attachments includes a winder configured to feed or wind the supports to adjust lengths of the supports; and
   the relays are outward of the winder.

3. The aerial vehicle according to claim 2, wherein the winders include respective motors each configured to adjust a length of a corresponding one of the supports;
   the motors are housed in a motor assembly;
   the motor assembly includes a waterproof section and a dustproof section; and
   the motor assembly is in a center region of the airframe in a plan view.

4. The aerial vehicle according to claim 1, wherein each of the relays includes a pulley.

5. The aerial vehicle according to claim 1, wherein each of the lift generators includes a rotor.

* * * * *